(12) United States Patent
Chung

(10) Patent No.: US 8,584,996 B2
(45) Date of Patent: Nov. 19, 2013

(54) SUPPORT STAND

(75) Inventor: Chih-Cheng Chung, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 13/425,178

(22) Filed: Mar. 20, 2012

(65) Prior Publication Data
US 2012/0241581 A1 Sep. 27, 2012

(30) Foreign Application Priority Data
Mar. 21, 2011 (TW) .............................. 100109603 A

(51) Int. Cl.
*F16M 11/14* (2006.01)
*A47G 23/02* (2006.01)
*H05K 5/00* (2006.01)
*H05K 7/00* (2006.01)

(52) U.S. Cl.
USPC ................... 248/183.4; 248/346.06; 248/919; 248/920; 248/149; 361/679.55; 361/679.56

(58) Field of Classification Search
USPC .............. 248/441.1, 917, 919, 920, 921, 922, 248/924, 149, 292.12, 447, 448, 450, 458, 248/415, 416; 49/343; 361/679.41, 679.44, 361/679.55, 679.56
See application file for complete search history.

(56) References Cited

U.S. PATENT DOCUMENTS

| | | | |
|---|---|---|---|
| 6,161,806 A | 12/2000 | Crosson | |
| 6,950,302 B2 * | 9/2005 | Hubbard | 361/679.55 |
| 7,512,428 B2 * | 3/2009 | An et al. | 455/575.3 |
| 7,712,719 B2 | 5/2010 | Derry et al. | |
| 7,963,488 B2 * | 6/2011 | Hasegawa et al. | 248/183.2 |
| 7,969,732 B1 * | 6/2011 | Noble | 361/679.56 |
| 8,186,638 B2 * | 5/2012 | Nishida et al. | 248/292.12 |
| 2002/0121584 A1 * | 9/2002 | Najmi | 248/441.1 |
| 2007/0063115 A1 * | 3/2007 | Ye | 248/231.61 |
| 2008/0100997 A1 * | 5/2008 | Chen | 361/681 |
| 2009/0294617 A1 * | 12/2009 | Stacey et al. | 248/316.1 |

FOREIGN PATENT DOCUMENTS

| | | |
|---|---|---|
| CN | 101071649 A | 11/2007 |
| WO | WO2006/053382 | 5/2006 |

* cited by examiner

*Primary Examiner* — Daniel J Troy
*Assistant Examiner* — Muhammad Ijaz
(74) *Attorney, Agent, or Firm* — Muncy, Geissler, Olds & Lowe, PLLC

(57) ABSTRACT

A support stand includes a first casing, a rotary mechanism, a second casing and a holder. The rotary mechanism is disposed in the first casing and has a first gear and a threaded rod coordinated with each other. The second casing is connected with the rotary mechanism. The second casing is able to rotate from a first position to a second position in relative to the first casing. The holder is connected with the threaded rod. When the second casing is at the first position, the holder is stored in the first casing. When the second casing is rotated to the second position, the second casing drives the first gear to coordinately rotate the threaded rod so as to push the holder out of the first casing. The support stand occupies less space as the holder is stored, and it has better overall integrity.

9 Claims, 8 Drawing Sheets

SUPPORT STAND

CROSS REFERENCE TO RELATED APPLICATIONS

This Non-provisional application claims priority under 35 U.S.C. §119(a) on Patent Application No(s). 100109603 filed in Taiwan, Republic of China on Mar. 21, 2011, the entire contents of which are hereby incorporated by reference.

BACKGROUND OF THE INVENTION

1. Technology Field

The disclosure relates to a support stand and, in particular, to a rotatable support stand.

2. Related Art

The conventional desktop support stands, such as the cell phone stands, e-paper stands, or tablet computer stands, are all have open designs. FIG. 1A is a perspective view of a conventional support stand 1 for a tablet computer, and FIG. 1B is a schematic diagram of the support stand 1 in use. As shown in FIGS. 1A and 1B, the support stand 1 has the same configuration in both the in-use mode and not-in-use mode. Accordingly, when the support stand 1 is not in use, it still occupies a certain space.

In addition, since the support stand 1 has limitations in its ordinary shape and position in angle, the stand body 11 must have an opening O matching the appearance of the electronic device E as well as a proper viewing angle. Unfortunately, while the conventional support stand 1 is not in use, it must be disassembled for storage and can not be properly stored as a whole. In other words, the support stand 1 does not provide a proper storage, and it does not have a good integrity.

SUMMARY

The disclosure is to provide a support stand that occupies less space as in storage and has better integrity.

To achieve the above, the embodiment of the present invention discloses a support stand including a first casing, a rotary mechanism, a second casing and a holder. The rotary mechanism is disposed in the first casing and has a first gear and a threaded rod which are coordinated with each other. The second casing is connected with the rotary mechanism. The second casing is able to rotate from a first position to a second position in relative to the first casing. The holder is connected with the threaded rod. When the second casing is at the first position, the holder is stored in the first casing. When the second casing is rotated to the second position, the second casing drives the first gear to coordinately rotate the threaded rod so as to push the holder out of the first casing.

In one embodiment, the first casing has a top cover and a base shell, and the top cover covers the base shell.

In one embodiment, the first casing has a fixing element disposed in the base shell, and the first gear and the threaded rod are disposed at the fixing element.

In one embodiment, the second casing rotates by 180 degrees for rotating from the first position to the second position.

In one embodiment, the rotary mechanism further has a second gear, and the second casing is connected to the second gear so as to allowing the second casing to rotate from the first position to the second position.

In one embodiment, the second casing is connected to the second gear via a connecting element.

In one embodiment, the first gear and the second gear are coordinately configured.

In one embodiment, the first gear and the second gear form a coupling angle, which is 60 degrees.

In one embodiment, when the second casing is rotated from the first position to the second position, the second gear is correspondingly rotated relative to the first casing, thereby driving the first gear to coordinately rotate the threaded rod so as to push the holder out of the first casing.

As mentioned above, in the support stand of the embodiment, the holder is received in the first casing as the second casing is located at the first position relative to the first casing. In addition, when the second casing is rotated to the second position relative the first casing, the second casing drives the first gear of the rotary mechanism to coordinately rotate the threaded rod so as to push the holder out of the first casing. The holder is received in the first casing as the support stand of the present invention is at the first position (storage position), so that the support stand occupies less space. Otherwise, when the second casing is rotated to the second position (supporting position), the second casing can drive the rotary mechanism to rotate so as to push the holder out of the first casing for supporting an object. Accordingly, the support stand of the present invention is suitable for supporting an object. Besides, when it is not in use, the holder can be stored in the first casing, so that the support stand can occupy less space and has better integrity. Moreover, the support stand of the present can be easily operated.

These and other features, aspects and advantages of the present invention will become better understood with regard to the following description, appended claims, and accompanying drawings.

DETAILED DESCRIPTION OF THE INVENTION

The present invention will be apparent from the following detailed description, which proceeds with reference to the accompanying drawings, wherein the same references relate to the same elements.

Figure 1A:
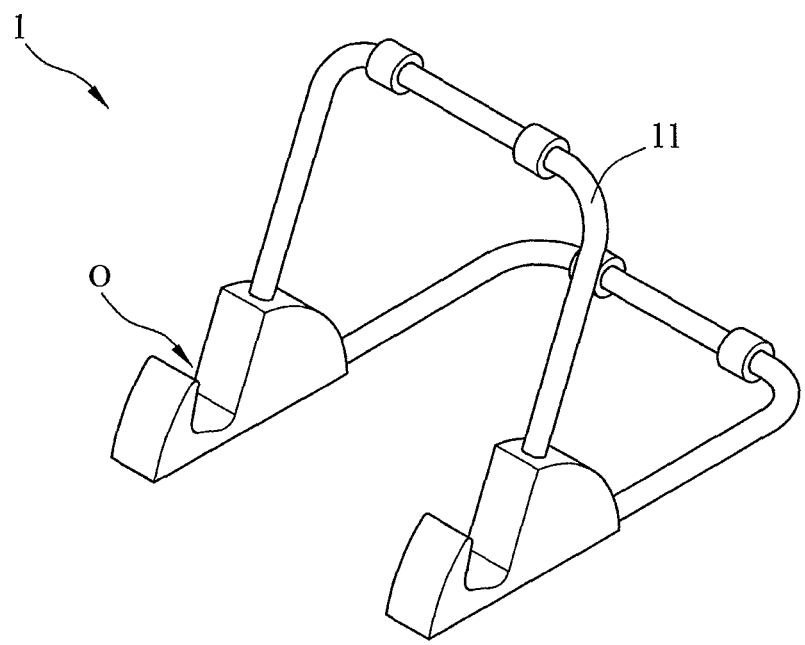
FIG. 1A is a perspective view of a conventional support stand for a tablet computer.
Figure 1B:
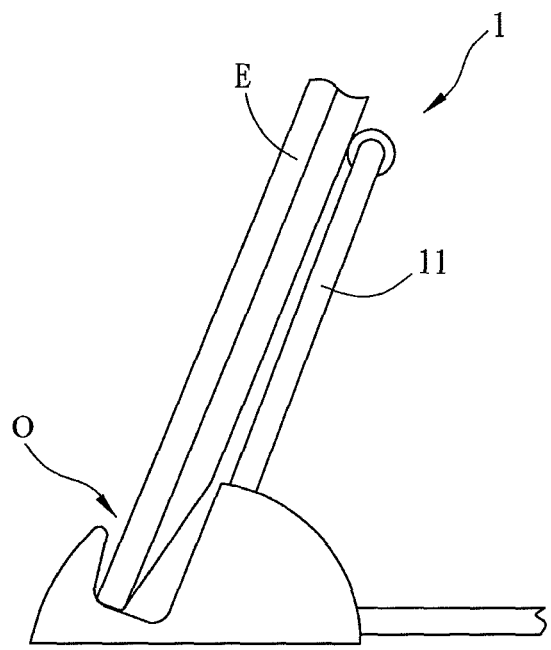
FIG. 1B is a schematic diagram of the support stand of FIG. 1A, which is in use.
Figure 2A:
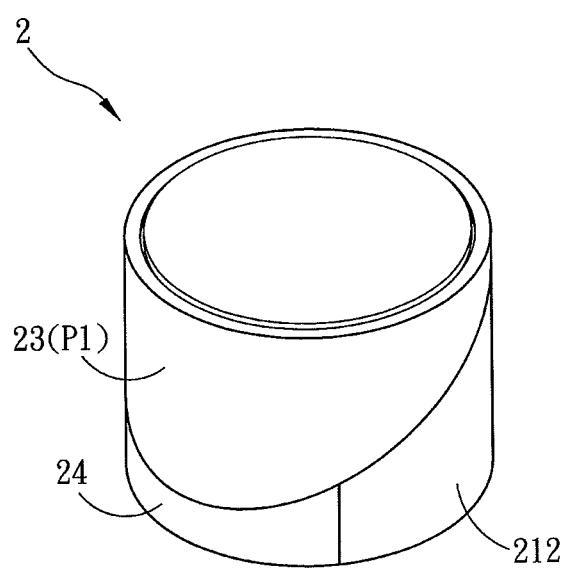
FIG. 2A is a schematic diagram showing a support stand, which is in a storage position, according to an embodiment of the present invention.
Figure 2B:
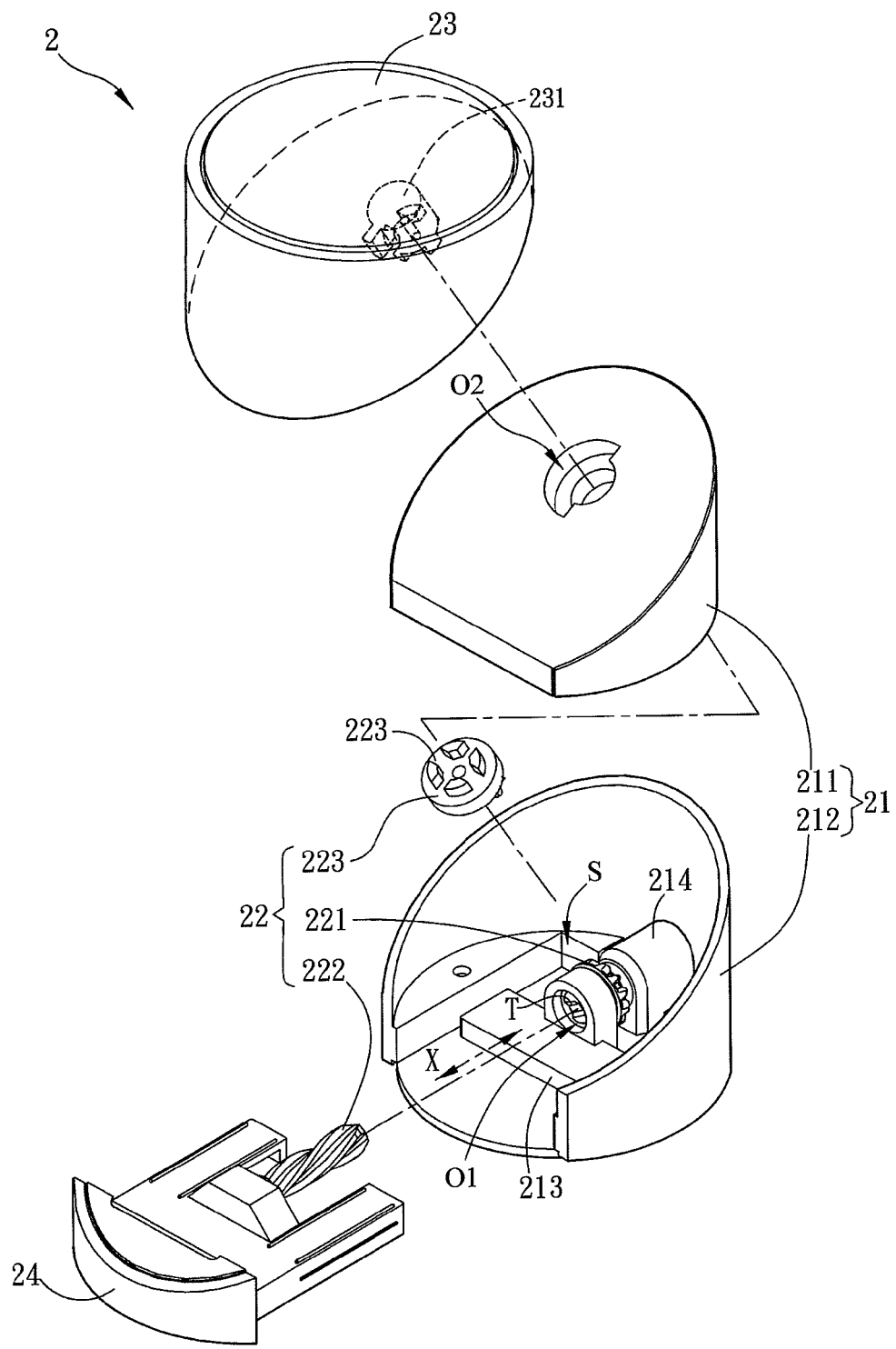
FIG. 2B is an exploded view of the support stand of FIG. 2A.

FIG. 2A is a schematic diagram showing a support stand 2, which is in a storage position, according to an embodiment of the present invention, and FIG. 2B is an exploded view of the support stand 2. Referring to FIG. 2A, the support stand 2 is not in use and it is in a storage position. Obviously, the support stand 2 has good integrity and occupies less space. Alternatively, the shape of the support stand 2 may be a polyhedron, such as a cylinder, a cube, or other shapes. In this case, the shape of the support stand 2 is a cylinder. Furthermore, the support stand 2 can be applied to support, for example, a paper document or an electronic device such as a tablet computer, a touch-screen cell phone, an e-paper, or a GPS.

The support stand 2 includes a first casing 21, a rotary mechanism 22, a second casing 23, and a holder 24.

The first casing 21 has an accommodating space S. In this case, the first casing 21 has a top cover 211 and a base shell 212. The top cover 211 covers the base shell 212, and the top cover 211, the base shell 212 and the holder 24 define the accommodating space S. The rotary mechanism 22 is disposed in the first casing 21. In more specific, the rotary mechanism 22 is disposed in the accommodating space S. In addition, the first casing 21 has a fixing element 213 disposed in the base shell 212.

The rotary mechanism 22 has a first gear 221 and a threaded rod 222, which are coordinated with each other. In this case, the thread formed on the surface of the threaded rod 222 matches the teeth T of the first gear 221. Thus, when the first gear 221 rotates, the threaded rod 222 is driven to move.

The teeth T of the first gear 221 have a depth of 2 mm along the X direction, and the surface of the threaded rod 222 is configured with a twisted or threaded shape. In this case, the surface of the threaded rod 222 is configured with a twisted shape. In other words, the threaded rod 222 with a twisted shape can coordinate with the teeth T of the first gear 221.

The first gear 221 and the threaded rod 222 are disposed at the fixing element 213. In more detailed, the threaded rod 222 is disposed through a hole O1 of the fixing element 213 and connected to the first gear 221. In addition, the first casing 21 may further include another fixing element 214 disposed on the base shell 212, and the first gear 221 is configured between the fixing elements 213 and 214. In other words, the first gear 221 is located between the fixing elements 213 and 214, and the threaded rod 222 passes through the hole O1 of the fixing element 213 to connect with the first gear 221.

Figure 2C:
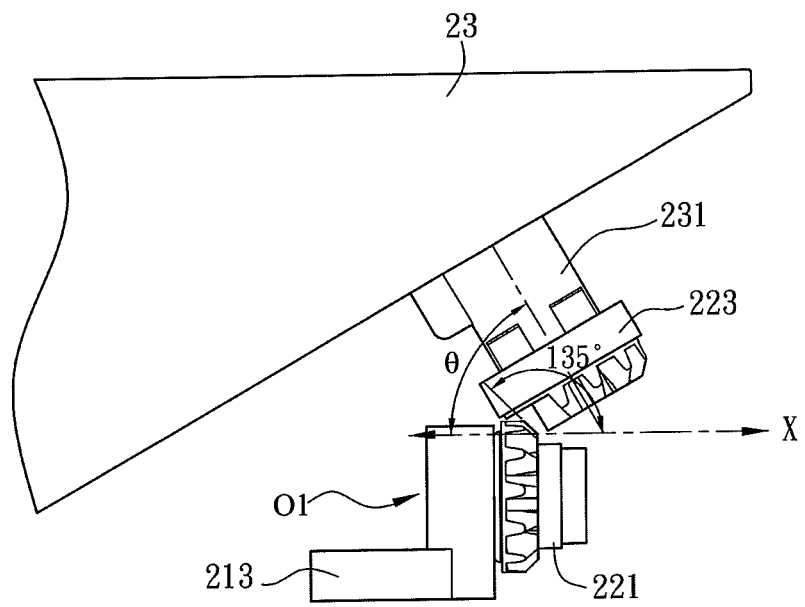
FIG. 2C is a local schematic view of the support stand of FIG. 2A.

The rotary mechanism 22 further includes a second gear 223, and the second casing 23 is connected to the second gear 223. In this case, the second gear 223 is connected to a connecting element 231 of the second casing 23 through a hole O2 of the top cover 211, thereby allowing the second casing 23 to rotate from a first position P1 to a second position P2. Referring to FIG. 2C, the second gear 223 is configured coordinating to the first gear 221, and they are cooperating bevel gears. Of course, this invention is not limited to this example, and any gear set that including the coordinating first gear 221 and second gear 223 is applicable. In this case, the bevel gears can properly transfer the driving power between two connecting axes. Accordingly, the configuration of two bevel gears can allow the moving second casing 23 to drive the threaded rod 222 to rotate, thereby pushing the holder 24 out of the first casing 21. The first gear 221 and the second gear 223 form a coupling angle θ, which is 60 degrees for example. Besides, an included angle between the direction X and the teeth surface of the first gear 221 is 135 degrees. Of course, any angle that can allow the teeth of the first gear 221 and the second gear 223 to engage with each other is applicable.

Figure 2D:
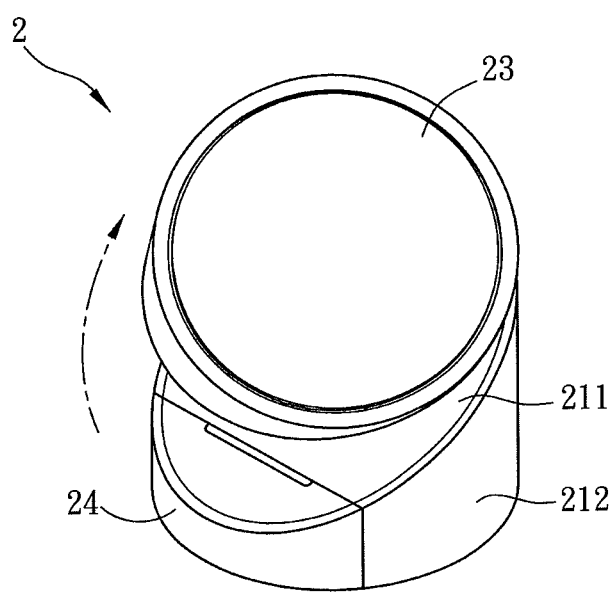
FIGS. 2D and 2E are schematic diagrams showing the transformations of the support stand of FIG. 2A.
Figure 2E:
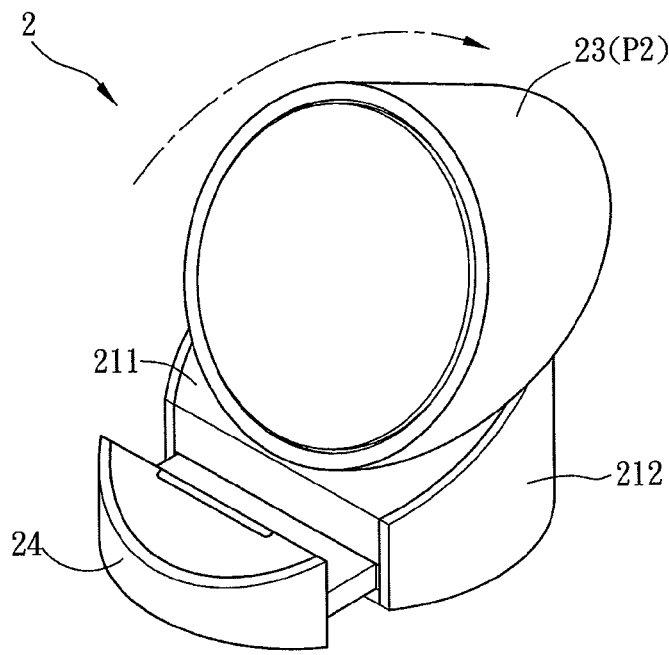
Figure 2F:
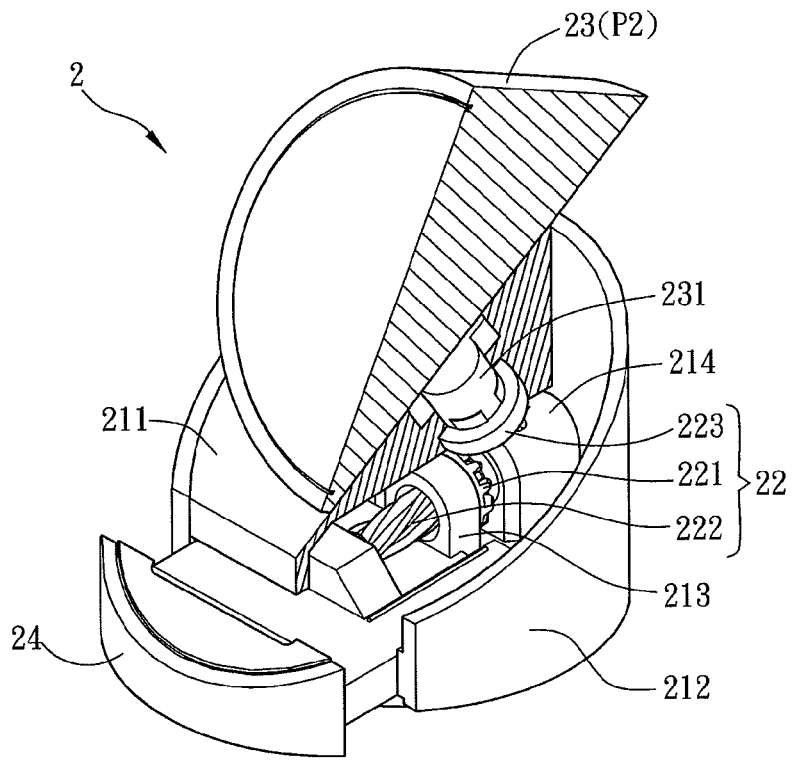
FIG. 2F is a local sectional view of the support stand of FIG. 2A.

FIGS. 2D and 2E are schematic diagrams showing the transformations of the support stand 2, and FIG. 2F is a local sectional view of the support stand 2.

Figure 3:
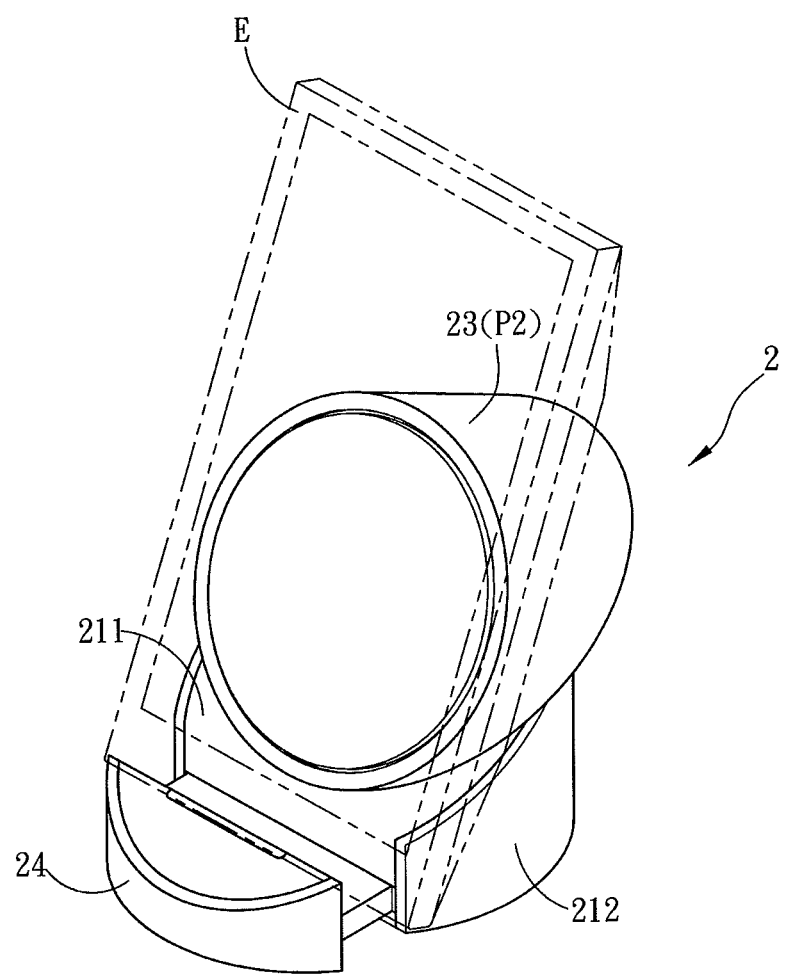
FIG. 3 is a schematic diagram showing the support stand of FIG. 2A, which is in use.

With reference to FIGS. 2A and 2E, the second casing 23 is able to rotate from the first position P1 to the second position P2 in relative to the first casing 21. When the support stand 2 is in a storage state, the second casing 23 is located at the first position P1 in relative to the first casing 21. Otherwise, when the support stand 2 is in a usage state for supporting an object, the second casing 23 is located at the second position P2 in relative to the first casing 21. In this case, the second casing 23 rotates by an angle of 180 degrees for rotating from the first position P1 to the second position P2. As shown in FIG. 3, an included angle between the electronic device E and a horizontal plane is substantially 120 degrees, so that the user can easily operate or view the electronic device E. Of course, in other embodiments, the second casing 23 may rotate by another angle for rotating from the first position P1 to the second position P2. In other words, it is possible to design different rotating angles for various demands, thereby allowing the support stand 2 to satisfy the purpose of the user.

The holder 24 is connected with the threaded rod 222 of the rotary mechanism 22. Referring to FIG. 2A, when the second casing 23 is located at the first position P1, the holder 24 is stored in the first casing 21. Referring to FIG. 2F, when the second casing 23 is rotated to the second position P2, the second casing 23 correspondingly rotates the second gear 223, thereby driving the first gear 221 to coordinately rotate the threaded rod 222 so as to push the holder 24 out of the first casing 21. In other words, when the second casing 23 is rotated from the first position P1 to the second position P2, the connecting element 231 can drive the second gear 223 to rotate, thereby driving the first gear 221 to coordinately rotate the threaded rod 222 so as to push the holder 24 out of the first casing 21. As shown in FIG. 3, the holder 24 can be used to support the electronic device E or other proper object, and the second casing 23 can provide a supporting surface. Thus, the user can easily operate or use the electronic device E.

Figure 4A:
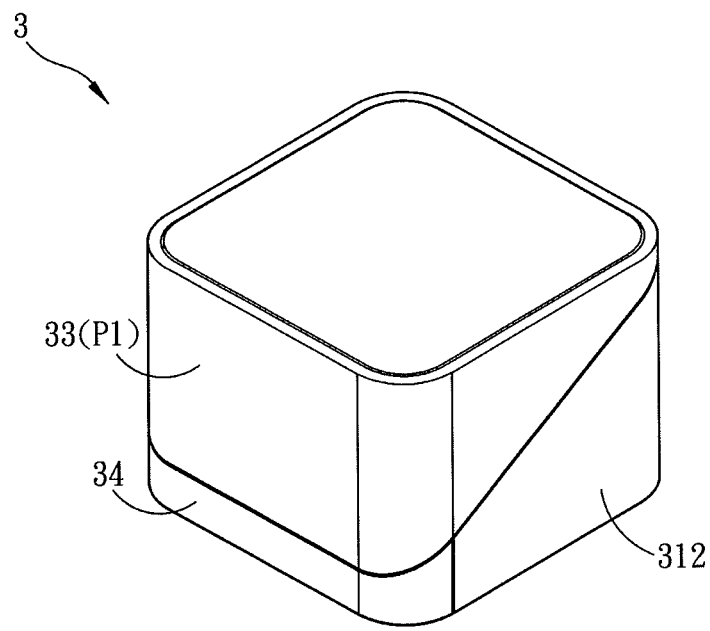
FIG. 4A is a schematic diagram showing another support stand, which is in a storage position, according to the embodiment of the present invention.
Figure 4B:
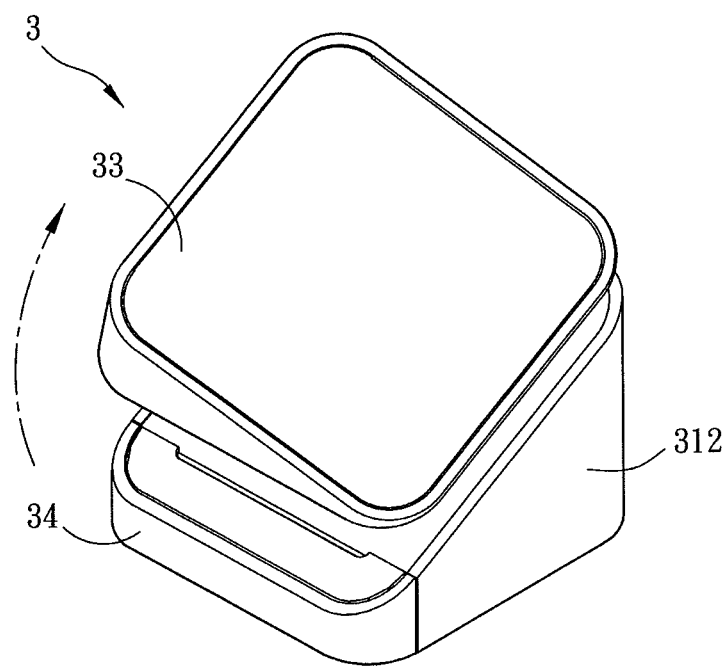
FIGS. 4B and 4C are schematic diagrams showing the transformations of the support stand of FIG. 4A.
Figure 4C:
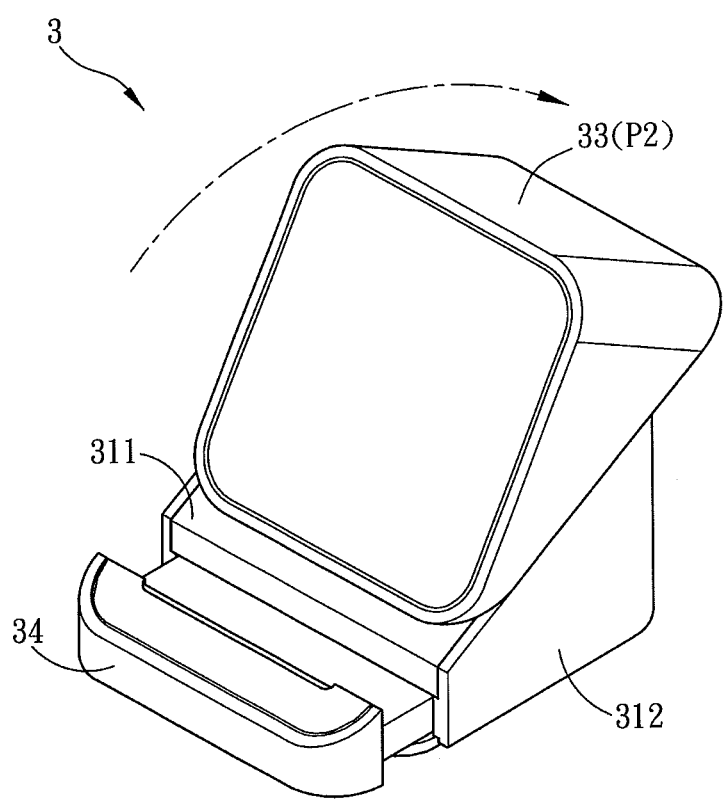

FIG. 4A is a schematic diagram showing another support stand 3, which is in a storage position, according to the embodiment of the present invention, FIG. 4B is a schematic diagram showing the support stand 3 during transformation, and FIG. 4C is a schematic diagram showing the support stand 3 ready for supporting an object.

The support stand 3 is different from the above-mentioned support stand 2 in that the shape of the support stand 3 is a cube. Besides, the technical features of the components of the support stand 3 is the same as those of the support stand 2, so the detailed description thereof will be omitted.

To sum up, in the support stand of the present invention, the holder is received in the first casing as the second casing is located at the first position relative to the first casing. In addition, when the second casing is rotated to the second position relative the first casing, the second casing drives the first gear of the rotary mechanism to coordinately rotate the threaded rod so as to push the holder out of the first casing. Compared with the prior art, the holder is received in the first casing as the support stand of the present invention is at the first position (storage position), so that the support stand occupies less space. Otherwise, when the second casing is rotated to the second position (supporting position), the second casing can drive the rotary mechanism to rotate so as to push the holder out of the first casing for supporting an object. Accordingly, the support stand of the present invention is suitable for supporting an object. Besides, when it is not in use, the holder can be stored in the first casing, so that the support stand can occupy less space and has better integrity. Moreover, the support stand of the present can be easily operated.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A support stand, comprising:
   a first casing;
   a rotary mechanism disposed in the first casing and having a first gear and a threaded rod, wherein the first gear and the threaded rod are engaged and configured to move in coordination with each other;
   a second casing connected with the rotary mechanism, wherein the second casing is able to rotate from a first position to a second position relative to the first casing; and
   a holder connected with the threaded rod; wherein, when the second casing is at the first position, the holder is stored in the first casing, and when the second casing is rotated to the second position, the second casing drives the first gear to coordinately rotate the threaded rod so as to push the holder out of the first casing; wherein the support stand is configured to hold a personal electronic device.

2. The support stand of claim 1, wherein the first casing has a top cover and a base shell, and the top cover covers the base shell.

3. The support stand of claim 2, wherein the first casing has a fixing element disposed in the base shell, and the first gear and the threaded rod is disposed at the fixing element.

4. The support stand of claim 1, wherein the second casing rotates by 180 degrees for rotating from the first position to the second position.

5. The support stand of claim 1, wherein the rotary mechanism further has a second gear, and the second casing is connected to the second gear so as to allowing the second casing to rotate from the first position to the second position.

6. The support stand of claim 5, wherein the second casing is connected to the second gear via a connecting element.

7. The support stand of claim 5, wherein the first gear and the second gear are coordinately configured.

8. The support stand of claim 5, wherein the first gear and the second gear form a coupling angle, and the coupling angle is 60 degrees.

9. The support stand of claim 5, wherein when the second casing is rotated from the first position to the second position, the second gear is correspondingly rotated relative to the first casing, thereby driving the first gear to coordinately rotate the threaded rod so as to push the holder out of the first casing.

* * * * *